United States Patent [19]
Taylor et al.

[11] Patent Number: 6,084,978
[45] Date of Patent: Jul. 4, 2000

[54] HIERARCHICAL STORAGE AND DISPLAY OF DIGITAL IMAGES USED IN CONSTRUCTING THREE-DIMENSIONAL IMAGE HARD COPY

[75] Inventors: Roy Y Taylor, Scottsville, N.Y.; Paul Walter Melnychuck, Hermosa Beach, Calif.

[73] Assignee: Eastman Kodak Company, Rochester, N.Y.

[21] Appl. No.: 08/169,681

[22] Filed: Dec. 16, 1993

[51] Int. Cl.[7] .................................................. G06K 9/36
[52] U.S. Cl. .......................................... 382/154; 382/302
[58] Field of Search .................................. 382/1, 41, 44, 382/47, 49, 56, 154, 240, 298, 299, 300, 302; 395/119; 356/12; 345/419

[56] References Cited

U.S. PATENT DOCUMENTS

| | | | |
|---|---|---|---|
| 4,661,986 | 4/1987 | Adelson | 382/41 |
| 4,797,942 | 1/1989 | Burt | 382/41 |
| 4,829,453 | 5/1989 | Katsuta et al. | 364/521 |
| 4,969,204 | 11/1990 | Melnychuck et al. | 382/56 |
| 5,010,581 | 4/1991 | Kanno | 382/56 |
| 5,029,228 | 7/1991 | Nonoyama et al. | 382/56 |
| 5,048,111 | 9/1991 | Jones et al. | 382/56 |
| 5,050,230 | 9/1991 | Jones et al. | 382/56 |
| 5,122,873 | 6/1992 | Golin | 358/133 |
| 5,278,608 | 1/1994 | Taylor et al. | 355/22 |

OTHER PUBLICATIONS

Peter J. Burt et al., "The Laplacian Pyramid as a Compact Image Code", *IEEE Transactions on Communications*, vol. COM-31, No. 4, Apr. 1983, pp. 532-540.

*Primary Examiner*—Andrew W. Johns
*Attorney, Agent, or Firm*—William F. Noval

[57] ABSTRACT

A system which captures multiple planar images of a scene taken from different perspectives and decomposes each of the captured those images into multiresolution images for storage in a distributable storage medium, such as an optical disk. The images on the storage medium are linked through a directory structure. During retrieval the user is allowed to browse various resolution images for selection purposes. After selection of the image, designation of the media type and designation of desired output resolution, the system reconstructs the images. The reconstructed images are converted into a depth image by interleaving slices of the images and then the depth image is output. Conversion into a depth image may require the creation of intermediate perspective views using interpolation.

9 Claims, 10 Drawing Sheets

HIERARCHICAL STORAGE AND DISPLAY OF DIGITAL IMAGES USED IN CONSTRUCTING THREE-DIMENSIONAL IMAGE HARD COPY

CROSS REFERENCE TO RELATED PATENTS AND APPLICATIONS

This application is related to U.S. Pat. Nos. 4,969,204, 5,048,111, 5,278,608 and 5,455,689, all incorporated by reference herein.

BACKGROUND OF THE INVENTION

1. Field of the Invention

The present invention is directed to a method and apparatus for storing, retrieving and displaying depth images and, more particularly, to a method and apparatus for storing, retrieving and displaying depth images stored in a multi-resolution format.

2. Description of the Related Art

Figure 1:
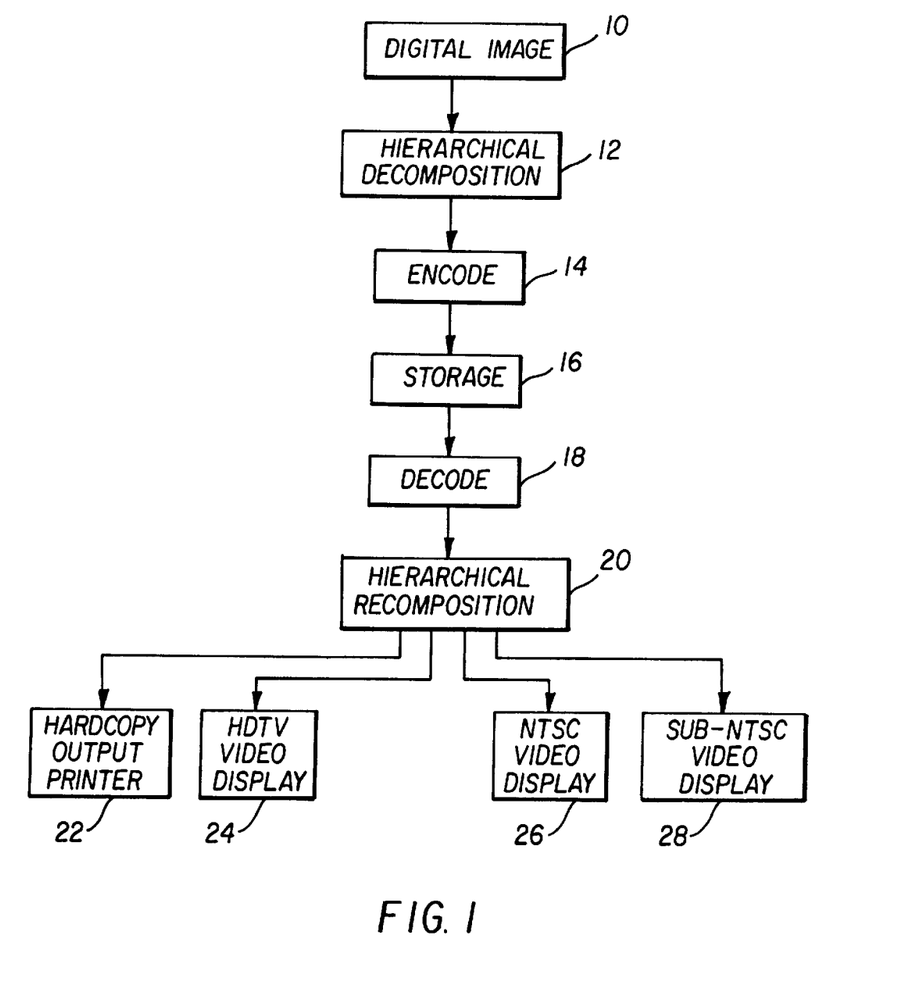
FIG. 1 illustrates planar image decomposition, storage, recomposition and display.

Hierarchical multiresolution image processing systems for planar images are currently available. In such systems an image hierarchy is constructed in the context of the multi-resolution environment whereby the user has the option of selecting the type of planar display medium and the desired resolution on this medium. In particular, two types of display media are considered: planar video monitors and planar color hard copies. Color hard copies are generated through photographic, thermal imaging, or other means. In such systems, as illustrated in FIG. 1, an original image 10 is decomposed 12, encoded 14 and stored in suitable storage 16 to provide versions at various resolutions. During retrieval and display the images are decoded 18, recomposed 20 and formatted for various types of displays 22, 24, 26 and 28 to allow the display of an HDTV quality planar image on video, an NTSC quality image with PAL/SECAM compatibility on video, one or more sub-NTSC quality images on video for overviews and browsing, and a very high quality planar image on color hard copy. U.S. Pat. Nos. 4,969,204 and 5,048,111 are typical of such multiresolution planar image systems.

Depth images are images that contain additional information beyond that of a conventional two-dimensional planar representation. This includes different viewing perspectives of a scene at locations on the display media that have an ordered spatial phase relationship to a lenticular or barrier faceplate to which the display media is laminated or otherwise affixed for viewing. The terms viewing and display are, however, not limited to traditional viewing devices such as video or color hard copy, and the means of displaying and viewing perspective data is not limited to a lenticular or barrier faceplate type display.

Figure 2:
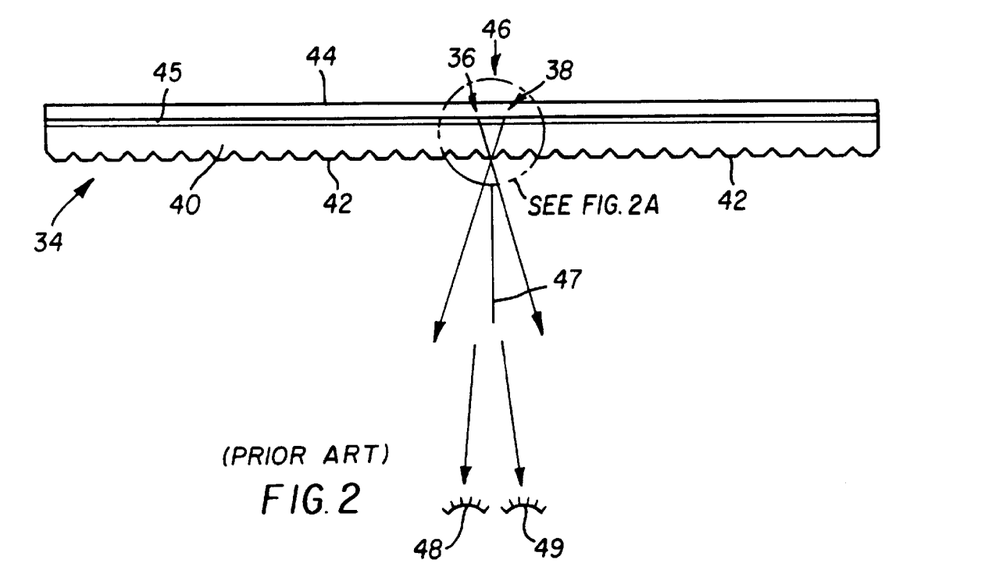
FIGS. 2 and 2A depict a lenticular display.
Figure 2A:
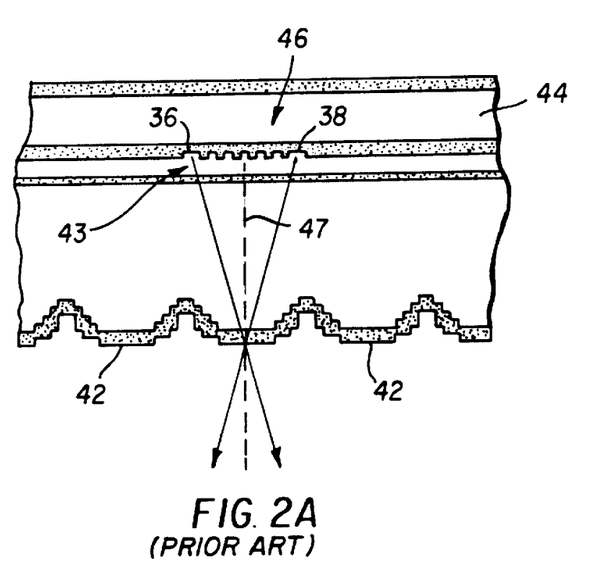

A depth image can be represented as a special extension of a two-dimensional planar image. A discussion of the theory of three dimensional imaging can be found in the text Okoshi, Three Dimensional Imaging Techniques, Academic Press, Inc., N.Y. 1976. A depth image 34 contains multiple perspective views 36 and 38 that offer additional spatial cues to the human eye (See FIG. 2). A depth image with two views can be viewed using special glasses or a special stereo monitor. When a depth image with more than two views is viewed through a lenticular faceplate 40, the additional perspective views allow the viewer to see additional scene information by lateral repositioning, or altering the viewing angle. The lenticular faceplate 40 comprises an array of optical cylindrical refracting surfaces 42 formed on the front surface of a sheet of transparent material, such as glass or plastic, with a thickness designed in consideration of the index of refraction and curvature of the refracting surfaces, to cause the collective focal plane to substantially coincide with the rear surface of the sheet. In the case of a hard copy depth image, the color pixels 43 imaged on the underlying hard copy substrate 44, held to the faceplate 40 typically by an adhesive 45, provide the image information. In a given image line cluster 46, the individual recorded pixels are organized to provide additional depth information about the nominal perspective center 47. The center line 47 is positioned at or adjacent to the center of the lenticule site, as is illustrated in FIG. 2. The lenticular display can be optimized for a particular viewing distance away from the lenticular faceplate 40 by gradually increasing the angle that the center line subtends with the line normal to the faceplate 40 as the distance increases. The image, however, can be viewed satisfactorily closer or farther than the nominal viewing distance for which the display has been optimized. A similar arrangement holds for video lenticular display. FIG. 2 also illustrates that the information seen by the left eye 48 is different from the information seen by the right eye 49, a condition that enables stereopsis by a viewer. If the viewer's head moves laterally, a gradually changing stereoscopic view or "look around" effect is seen as long as the excursion does not exceed the display angle.

A characteristic of depth images is the demand on the print or display media for high resolution images. Depth images generally improve in realism as the number of alternate perspectives are increased, and as the width of the lenticule decreases. A larger number of alternate perspectives minimizes the image location disparities between adjacent views, thus providing a smoother "look around". Hence, the resolution of the writing-recording engine has a pronounced effect on the perceived depth of the image. For example, consider a digital printer with a common writing resolution of 300 dots per inch. If 10 views per lenticule are desired, the required lenticular density would be one-tenth of 300 or 30 lenticules per inch. Assuming an ability of the human eye to resolve periodic structures of approximately 30 cycles per degree (See Van Ness and M. A. Bouman, Spatial Modulation Transfer in the Human Eye, JOSA, March 1967, Vol. 57 pp. 401–406), the depth image would require a viewing distance greater than 57 inches so as not to resolve the individual lenticules and hence, distract the viewer or reduce the depth effect. As a second example, consider a higher quality digital printer capable of writing at a resolution of 1200 dots per inch. To display 10 views per lenticule as in the previous example, a lenticular density of 120 per inch could be used, allowing a viewing distance of as little as 14 inches to realize the depth effect without distraction. With a number of digital printers available at any number of writing resolutions, the above examples illustrate the need for a depth image storage and retrieval system to accommodate a plurality of spatial resolutions.

A characteristic unique to depth image printing is that the resolution requirements in the horizontal and vertical directions differ. In the direction normal to the lenticule array, the resolution requirements are governed by the principles described in the previous examples. In the direction parallel to the lenticule array, the resolution requirements are governed by the viewing geometry, and could conceivably be as low as the lenticular spacing.

In digital imaging systems that take into account depth images, and in particular ones that include a multiresolution hierarchical form of digital storage and retrieval, the user may want to use a suitable digital storage medium, such as a magnetic or optical disk, for the distribution of the images. The user may also want to choose a desired image resolution from the hierarchy for the purposes of browsing, depth image video and hard copy display, or two-dimensional planar video and hard copy display. It is desirable to allow the user to have all the depth and planar information regarding an image organized in a way that supports both types of display, in a non-redundant fashion. For browsing applications, a user may also want to choose an image based on a quick, low-resolution planar display review. Upon selection of the image for high quality display, additional, non-redundant image data would need to be added to arrive at the desired resolution. Finally, additional, non-redundant perspective view information would need to be added for high quality depth viewing. It is desirable for the user to be allowed to retrieve low resolution image data using low cost retrieval devices while high resolution and depth image information may be retrieved by more capable, and hence more expensive devices and decoders.

What is needed is a system that meets the needs of a user and that allows browsing at low resolution and display of planar or depth images at higher resolution while retaining the ability to provide images at intermediate resolutions if desired.

SUMMARY OF THE INVENTION

An object of the present invention is to provide a method for storing and retrieving digital planar and depth images in a hierarchical format on a suitable digital storage distribution medium that allows the originator of the distribution medium to distribute the medium containing the entire image hierarchy for the purpose of retrieving low resolution images for browsing or proofing, retrieving higher resolution image data for high quality planar display, and retrieving additional view perspectives for progressively higher quality depth image display.

It is another object of the present invention to provide low resolution images for browsing, proofing, or image identification in a form that allows for direct retrieval of planar or stereoscopic display, without the need for additional recomposition steps as are required for high resolution residual components.

It is also an object of the present invention to provide higher resolution residual components for high quality planar display.

It is a further object of the present invention to provide at least one additional view perspective, to provide for stereoscopic display, or serve as the basis for a series of interpolated view perspectives.

It is an additional object of the present invention to provide additional view perspectives in a progressive fashion, to allow for progressively improved depth image display.

It is another object of the present invention to provide a simple means for the organization of all perspective views for a particular depth image into a unified file directory structure, to facilitate the storage and retrieval of all the required data for a particular depth image at any desired quality.

The above objects can be attained by a system which captures multiple planar images of a scene and decomposes those images into multiresolution images for storage in a distributable storage medium. The images on the storage medium are linked through a directory structure. Upon retrieval the user is allowed to browse low resolution images for selection purposes. Upon selection and designation of the media type and desired output resolution, the system recomposes the image (or images if a depth display is selected). The recomposed image or images are then output for display if a planar media has been selected. If a depth image media has been selected the images are converted into a depth image and output. Conversion into a depth image may require the creation of intermediate perspective views to allow for increased realism.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention combines hierarchical image decomposition used to create a series of residual components, direct retrieval of additional low resolution images using a residual pyramid, depth image creation methods and image browsing techniques to provide a system of storing, browsing, proofing and display of two-dimensional planar, and three-dimensional depth images in a distributed depth image system.

It is assumed that residual image components as discussed herein are encoded using a conventional symbol or entropy encoding technique such as Huffman coding or Q-coding, although it may be advantageous in some cases to store the data without symbol encoding to provide immediate and fast access to these components. The residual data may be conventionally quantized prior to encoding, or it may be encoded in a lossless manner, i.e., without quantization. In the following description of the preferred embodiments, it will also be assumed that the highest resolution of the image hierarchy is composed of 3072×2048 pixels and that this resolution is adequate to produce photographic quality originals on an appropriate digital output device. It is further assumed that a moderately high resolution level of the hierarchy composed of 1536×1024 pixels is adequate to generate a high quality HDTV display, or a small-sized photographic quality print on an appropriate digital output device. It is also assumed that the lowest resolution levels of 192×128 pixels, 384×256 pixels, and 768×512 pixels are generated and stored directly onto the digital storage medium and that these resolutions are adequate for image browsing and proofing. It is further assumed that an appropriate storage medium, such as the Kodak Photo CD™, is used as the distributable image medium.

Figure 3:
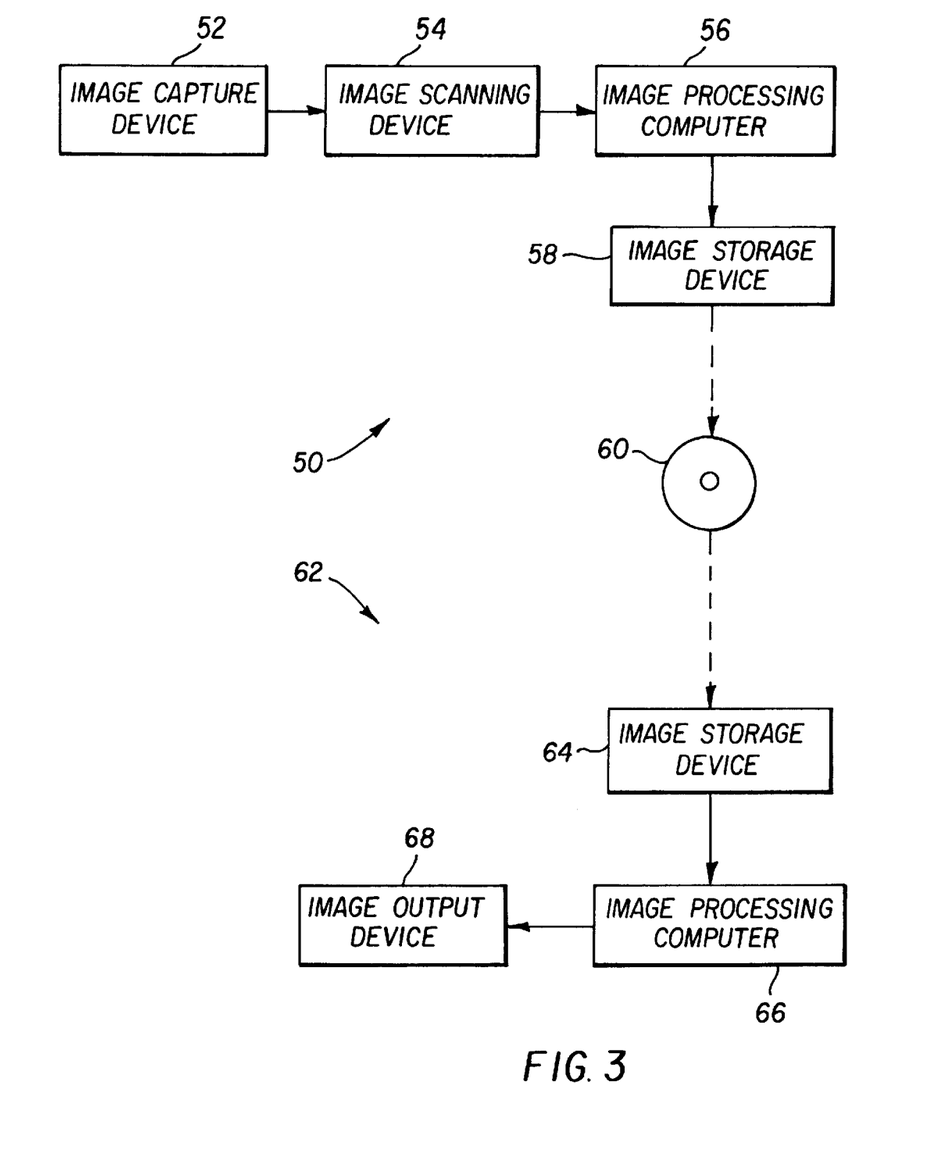
FIG. 3 illustrates hardware components of the present invention.

The present invention, as illustrated in FIG. 3, includes three components. An image capture and storage system 50 for capturing one or more images of a scene and storing the images on a distributable medium 60, such as the Photo CD™ previously mentioned, and a retrieval and display system 62 for retrieving the images from the medium 60 and outputting the images to an appropriate display as selected by the user. The image capture system 50 includes an image capture device 52, such as a conventional photographic camera, although an electronic camera can be used, an image scanning device 54, such as a Kodak PCD Film Scanner 2000, an image processing computer 56 which is typically a conventional workstation computer, such as a Kodak PCD Data Manager S200 and an image storage device 58 such as an optical disk writer like the Kodak PCD Writer 200 which stores the images in digital form on the medium 60. The output system 62 includes an image storage and retrieval device 64, such as an optical disk reader like the Apple CD300, an image processing computer 66, such as the workstation mentioned above or a MacIntosh 2FS and a suitable output device, such as a Kodak LVT 1620 printer. Of course the output device could just as well be a video display as illustrated in FIG. 1.

Figure 4:
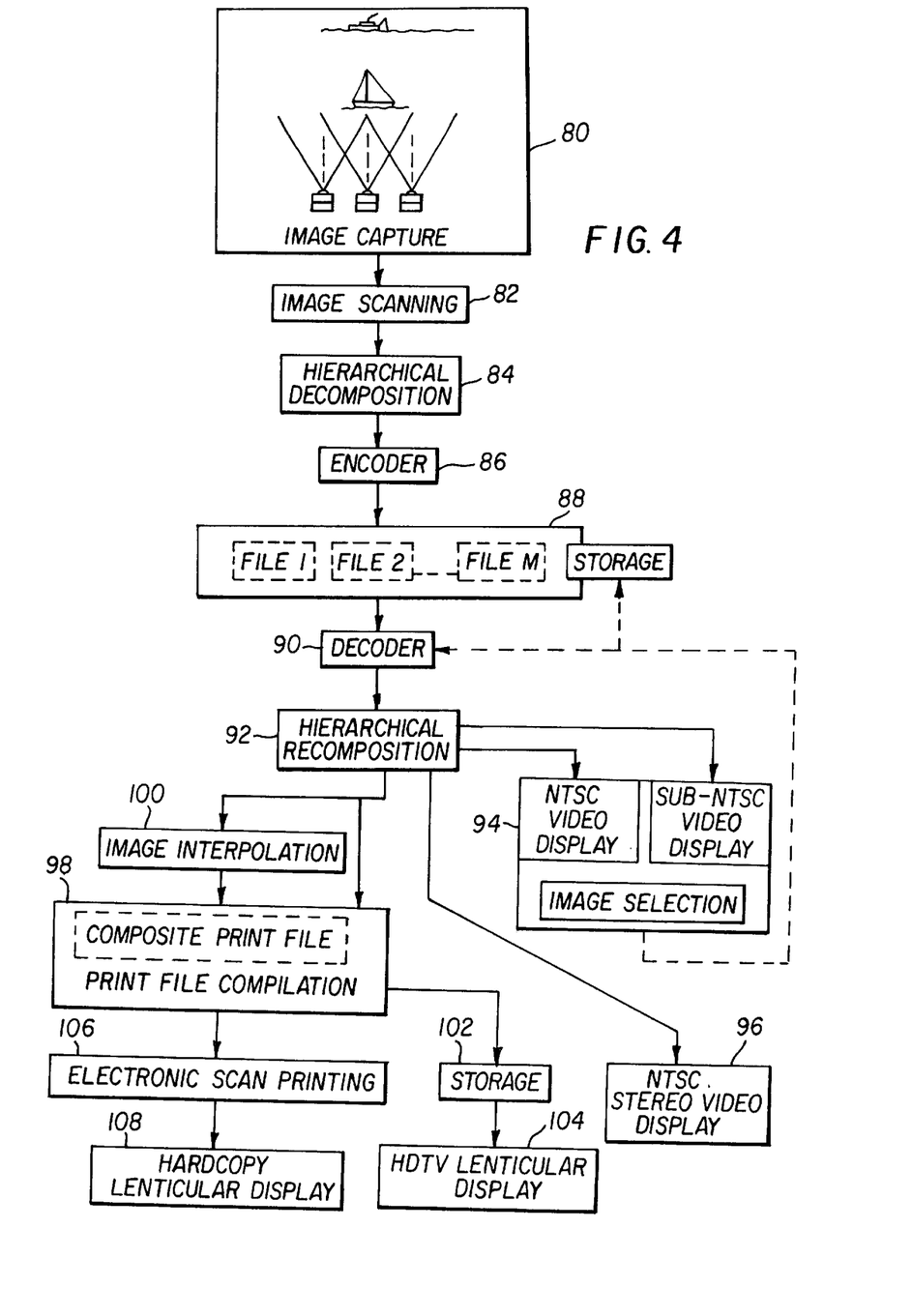
FIG. 4 illustrates steps and components of the present invention in more detail.

FIG. 4 is a block diagram of the components of the present invention. Images of a scene must first be captured 80 and scanned 82 using a system such as that described in the U.S. patent applications previously mentioned. Once the images are digitized hierarchical decomposition 84 is performed as described in the patents previously mentioned. The decomposed images are then encoded by an encoder 86. The hierarchical decomposition and encoding steps will be discussed in more detail with respect to FIGS. 5 and 7. The encoded images are stored on a storage medium 88 as image files. Once the user loads the image medium 88 into the output system 62 the user can, through conventional image browsing selection processes, such as occur in the Photoshop system by Adobe, select images for output. These images are decoded by a decoder and recomposed 92 as described in the previously mentioned patents. Recomposition will be discussed in more detail with respect to FIGS. 6 and 8. These recomposed images can be displayed on an appropriate display 94 during the image selection process. Once the appropriate images have been selected they can be output to the appropriate device. For example, if a relatively low resolution stereo image has been selected that image can be output at the desired resolution to the stereo video display 96. If a higher quality depth image is desired appropriate depth image processing as described in the related applications is performed. If the number of images stored are sufficient to create the quality of the depth image desired at the selected resolution, the images are provided directly to a print file compilation system 98 as described in the related applications. If insufficient images are available, in-between or intermediate images can be created by interpolation 100, as also described in the related applications previously mentioned, and the image file set is then provided to the print file compilation system 98. If the images are to be displayed in a video high resolution planar or depth image display 104 the depth image is provided to the appropriate storage 102. If the images are to be output in hard copy form the composite print file is provided to an electronic scan printing system 106 and used to create a hard copy depth image display 108. It is also possible for the reconstructed image to be stored with the unreconstructed images so that fast access is available, if desired, although this is less efficient.

Figure 5:
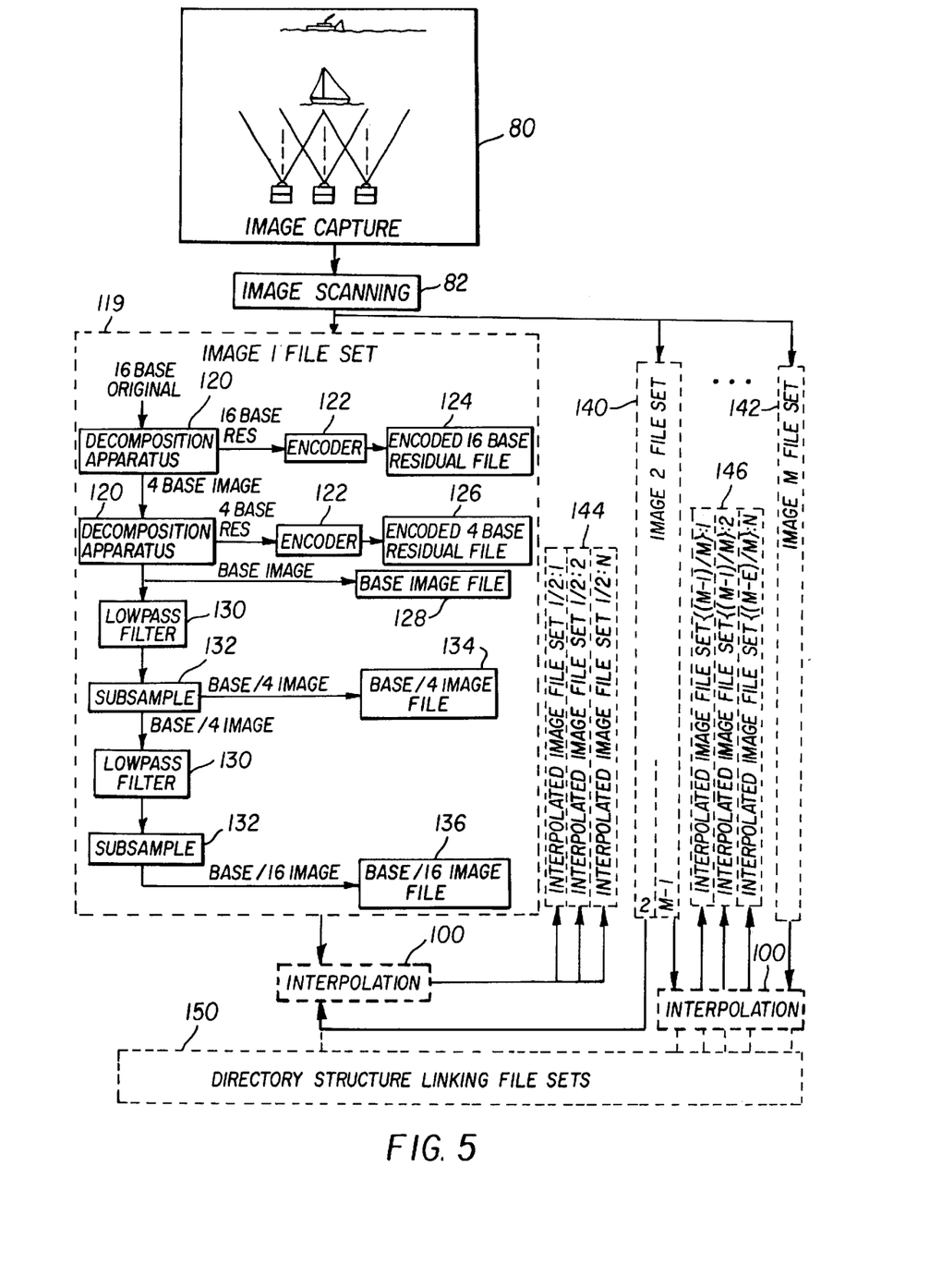
FIGS. 5 and 6 illustrate some of the operations of a first embodiment of FIG. 4 in more detail.

FIG. 5 illustrates the hierarchical decomposition and encoding process, when using the method described in U.S. Pat. No. 4,969,204, in greater detail. An original 16BASE image is decomposed by a decomposition apparatus 120 as described in the patent mentioned above to form a 4BASE image and a 16BASE residual. The 16BASE residual is subsequently encoded by encoder 122 and written to the digital storage medium 88 as a residual file 124. The 4BASE image is again applied to the decomposition apparatus 120 to produce a 4BASE residual which is encoded by the encoder to produce a residual file 126. The decomposition apparatus 120 also produces a BASE image for use as the lowest resolution and smallest image suitable for direct display as used by the typical browse feature in conventional systems, such as Apple systems, and which is stored in a base image file 128. The BASE image is passed through a low pass filter 130 and then subsampled 132 to create a BASE/4 image suitable for display during higher resolution browsing and which is stored in a BASE/4 image file 134 and which is larger in dimension than the BASE image. The BASE/4 image is again low passed filtered and subsampled 132 to create a BASE/16 image which is stored in a BASE/16 image file 136 and is suitable for display of larger format images. Identical processing is used to create the image file sets 140 and 142 for the other images that have been captured. Interpolated images 144 and 146 can also be created if desired by performing image interpolation 100 as described in the related applications previously mentioned. The images are linked through an appropriate directory structure 150 which will allow the images to be stored and retrieved in a systematic fashion.

The directory structure and file format for the embodiments described herein preferably should follow a similar form. Consider the first view to be the extreme left perspective view. This view is stored first and is retrieved for planar display. The second view to be stored is the extreme right perspective view, and is used for stereoscopic display. The remaining views are sequentially stored in order of decreasing importance to the depth effect. Thus, the views alternate between left and right, to the last view that is the center perspective view. As another example, the directory structure 150 could include an appropriate naming convention for linking the image files together. For example, when the images are captured and input to the system a descriptor of the image scene, such as "sailboat", can be used as part of the name of the file. The sequence of captured images can be numbered from right to left 1-m and this number or sequence capture order can be appended to the name mentioned above. The residual and base image files can be distinguished by appending an appropriate descriptor to the name and image sequence number. For example, the 16BASE residual file 124 can have the file name appendix "R16" while the BASE/4 image file 134 can have the appendix "B4". In such a naming convention, the encoded 4BASE residual file 126 of the eighth picture of the sailboat could be appropriately named "SAILBOAT.8R4". The related images would also be named similarly. Another linking mechanism is to store the files sequentially in a predetermined order such as storing images in sequential order from right perspective to left perspective and within each perspective according to resolution from lowest to highest where the residuals are stored adjacent to the BASE images. It is also possible to link the files together in a linked list type directory structure. Another ordering mechanism is to store the various resolution images and residual files in a predetermined order offset from a fixed point in a single file or in predetermined file order.

Figure 6:
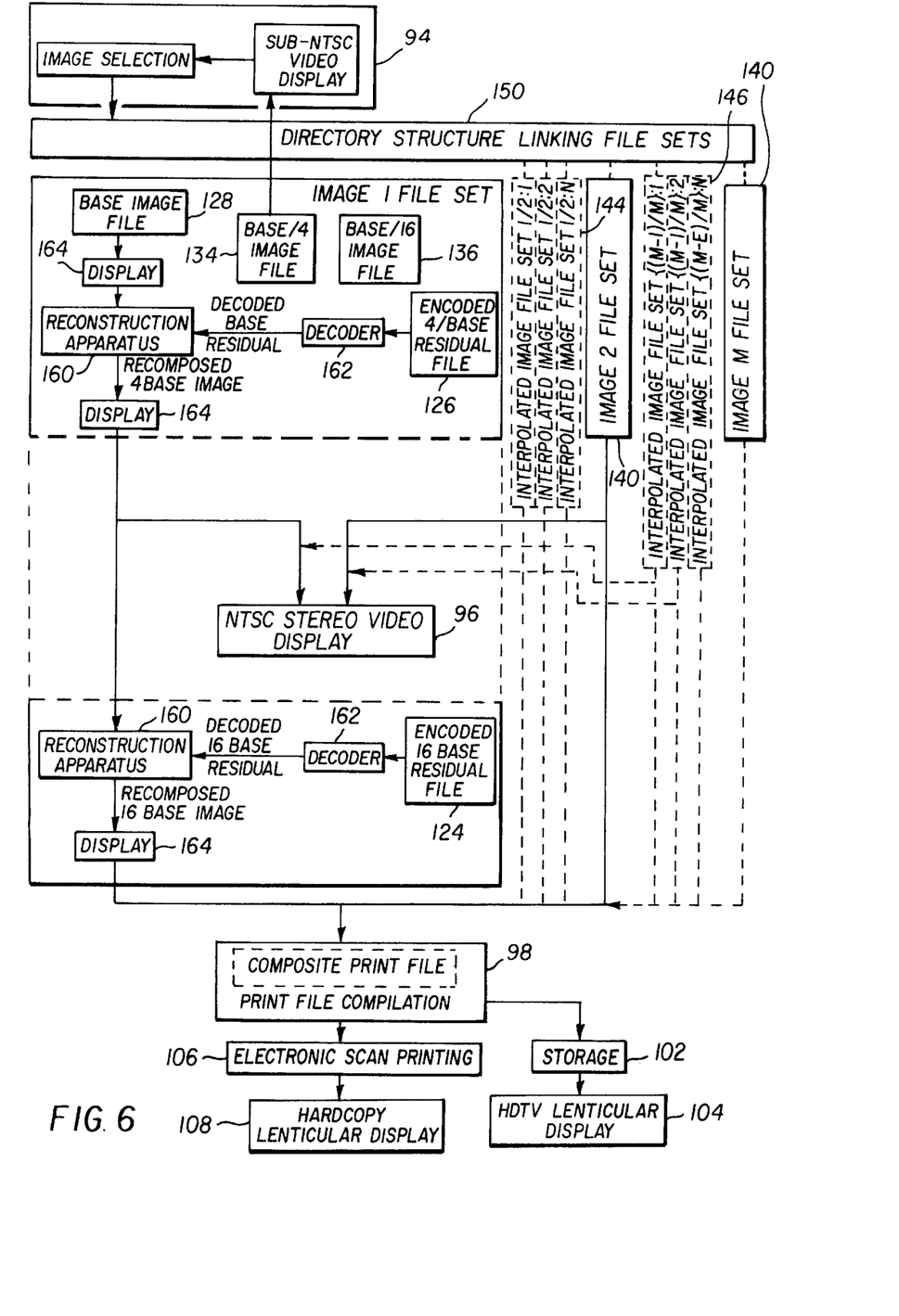

The details of the corresponding recomposition method are illustrated in FIG. 6. The BASE/16, BASE/4 and BASE images retrieved from the storage medium 88 are available for direct display during browsing allowing browsing at the desired resolution. However, the use of the BASE/4 resolution image is probably the best for browsing. To recreate the highest resolution or original, image recomposition or reconstruction apparatus 160, as described in detail in U.S. Pat. No. 4,969,204 is used to form a prediction image. A decoder 162 also as described in the above-identified patent produces a decoded 4BASE residual image which is combined with the prediction image to form a recomposed 4BASE image. This image may be displayed directly on an appropriate video display 96. This recomposed 4BASE image is applied to the recomposition or reconstruction apparatus 160 along with a decoded 16BASE residual to produce a recomposed 16BASE image which can be displayed 164. The recomposed images at the desired resolution are provided to the print file compilation system 98 and used to produce the appropriate display.

Figure 7:
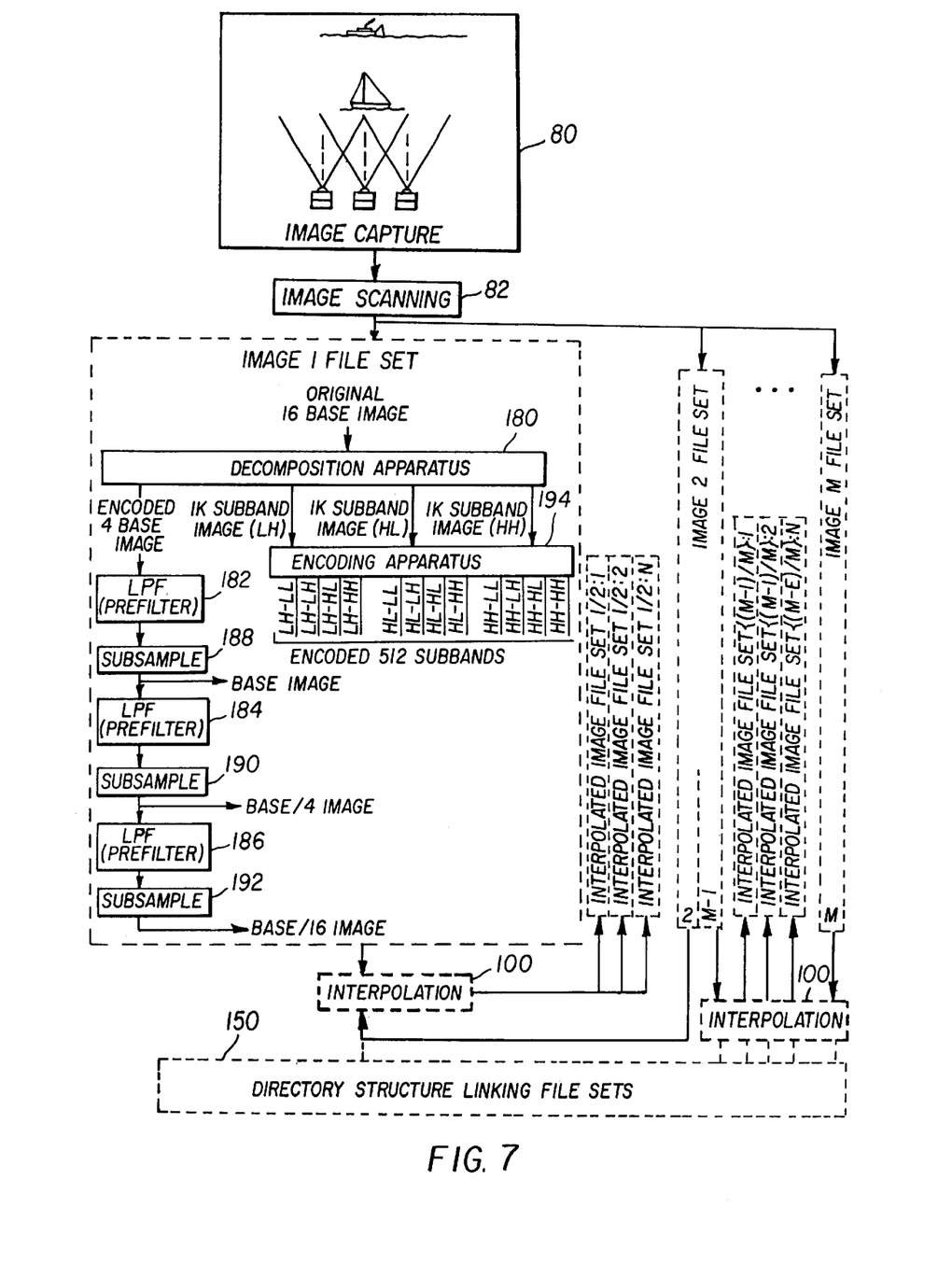
FIGS. 7 and 8 illustrate some of the operations of a second embodiment of FIG. 4 in more detail.
Figure 8:
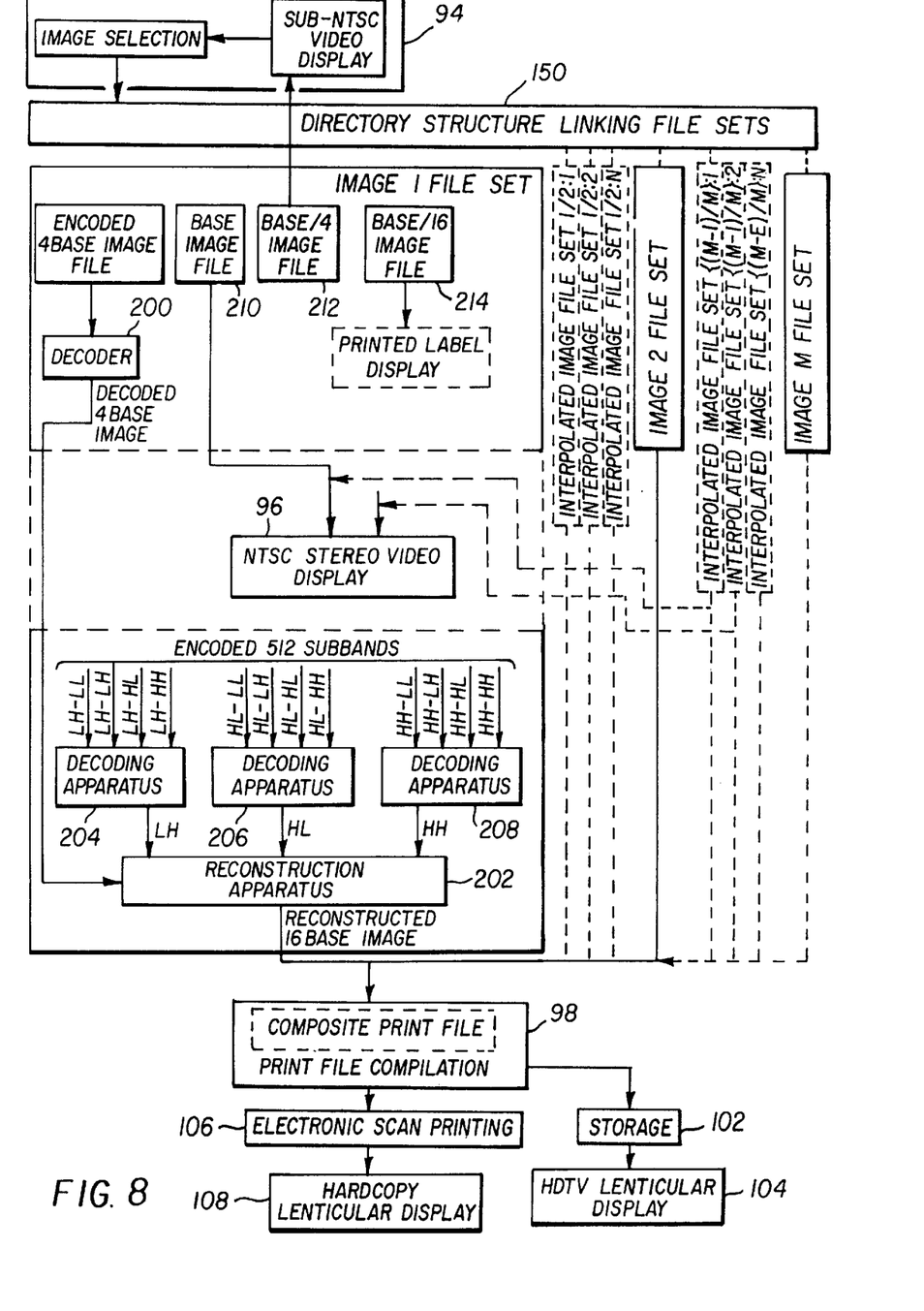

FIGS. 7 and 8 illustrate a second embodiment of the present invention which uses the decomposition and recomposition method described in U.S. Pat. No. 4,048,111. FIG. 7 illustrates the input and encoding side while FIG. 8 illustrates the recomposition and output side.

In FIG. 7 an original 16BASE image is decomposed by decomposition apparatus 180 to form a 4BASE image and a series of 512×768 spectral subbands. The 4BASE image is encoded and written to the digital storage medium. Through successive low pass filters 182, 184 and 186 and subsamplers 188, 190 and 192 the displayable BASE, BASE/4 and BASE/16 images are created and written to the digital storage medium. The subband images are encoded by encoding apparatus 194.

The corresponding recomposition method is illustrated in FIG. 8. The encoded 4BASE image is applied to a decoder 200. The decoded 4BASE image is applied to a reconstruction apparatus 202. The other inputs to the reconstruction apparatus are supplied by decoding devices 204, 206 and 208 which decode the encoded subbands. The reconstructed images, if depth images, are supplied to the compiliate device 98 and the depth image displayed.

Figures 9, 10:
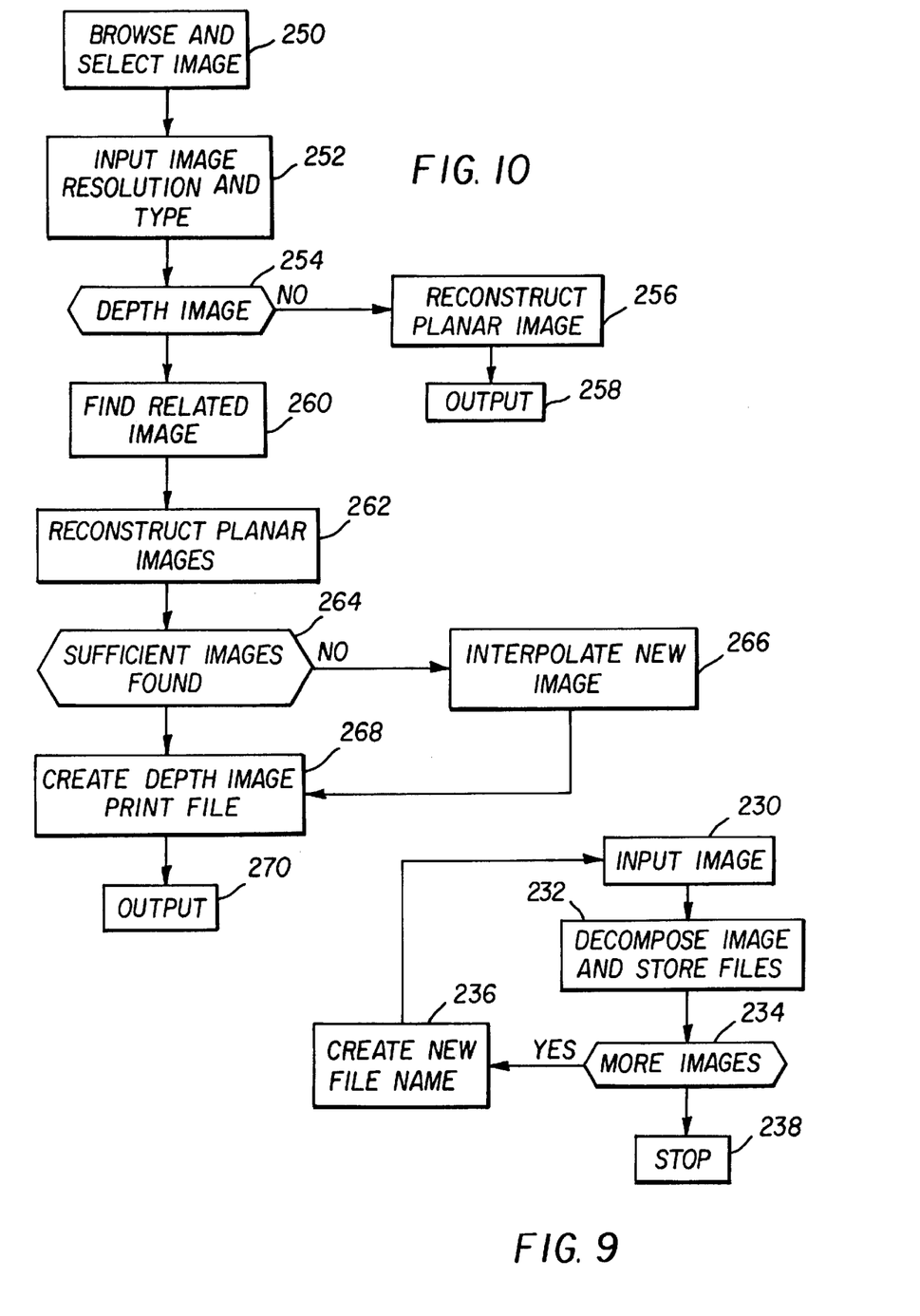
FIG. 9 depicts a typical capture, decomposition and storage operation.
FIG. 10 depicts a typical retrieval, reconstruction and display operation.

The typical sequence of operations during the decomposition and file storage operations are illustrated in FIG. 9. The first step 230 is to input the first captured images if this is a depth image set of images or the single captured image if the captured image is for planar display. Once the image is input it is decomposed 232 and the appropriate file stored in accordance with the operations previously discussed using, if desired, an image name supplied by the user. The system then determines 234 whether additional images of the same scene are available for input. If so, the system creates 236 an appropriate directory structure, such as a new file name in accordance with the naming convention previously discussed, thereby creating the directory structure linking the file sets. Once the new file name is created the system returns to input 230 the additional image. If no more images are to be input the system stops 238.

FIG. 10 illustrates the operations in a typical user session where the images are retrieved, reconstructed and displayed. The user in the first step 250 conventionally browses through the BASE images available for display where the system recognizes that the BASE image is the thumbnail type decomposed image and which is first in a series of possibly related images in accordance with the naming convention previously discussed. These thumbnail type images are displayed to the user using conventional software. Of course the BASE/4 and BASE/16 images can also be used for browsing if desired. Once the user has selected a desired image for reproduction the user inputs 252 the image resolution and the image type (planar or depth). If the image is not 254 a depth image the planar image is reconstructed 256 and output 258 to the appropriate display or printing device. If the type of image specified is a depth image the system, using the directory structure such as the naming convention previously discussed, finds the related images of the scene. The system then reconstructs 262 the planar images found at the resolution level specified by the user. The system then determines 264 if sufficient images for the depth image specified are found. For example, if the scene image searching process only finds two images with the same name and the particular quality of the depth images specified by the user requires 24 images then insufficient images have been found and the system must interpolate 266 the new images. Once sufficient images are available the system creates 268 the depth image print file as discussed in the related applications previously mentioned. The system then outputs 270 the composite print file to the appropriate display or printing device.

Figure 11:
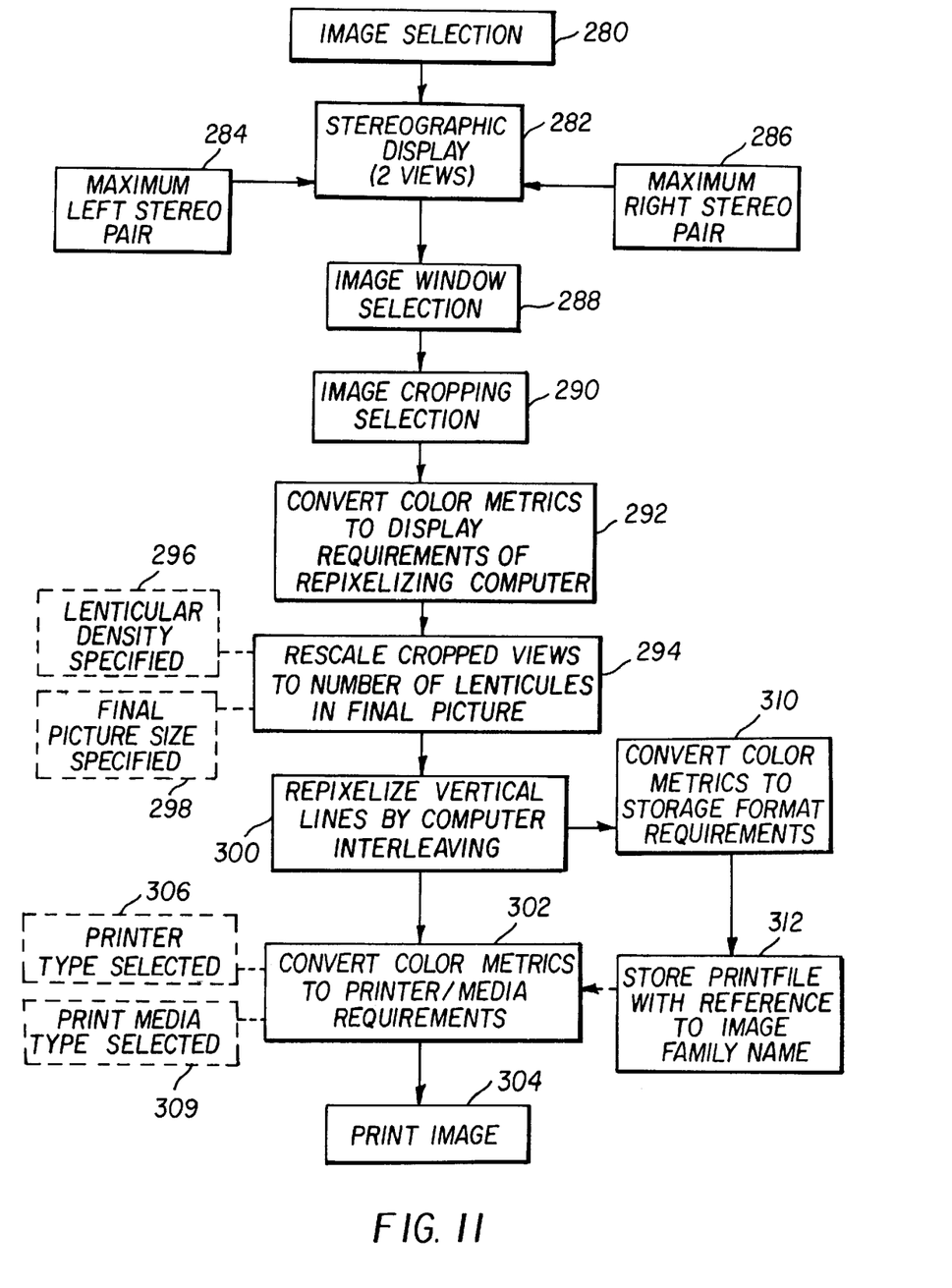
FIG. 11 illustrates other operations that can be performed during retrieval and reconstruction.

FIG. 11 illustrates additional operations which can be performed if desired during the depth image reconstruction and output process. As previously mentioned image selection 280 can be accomplished by directory selection of an identifying name or identification of a sample planar image in reduced scale and input of the desired resolution on either a computer monitor or on a label associated with the storage media. Assessment of a stereographic presentation of the image selected could be accomplished by displaying 282 for viewing any two views of the perspective set. This can be done by making hardcopy planar images, taping them together at an edge and viewing them with a prism wedge held in front of one eye to divert that eye's line of sight to one planar image while the other eye's line of sight is directed to the other planar image. However, in a preferred system approach, the file retrieval workstation 66 incorporates a stereographic monitor to present a left image to the viewer's left eye and a right image to the right eye. Stereographic monitors are readily available in the commercial marketplace as evidenced by the Textronics Model TEK 4126 Stereoscopic Color Graphics Workstation and the StereoGraphics CrystalEyes systems. For a full assessment of image impact, the operator may change the stereo pairs displayed to include the left maximum perspective captured and right maximum perspective captured as shown in block 284 and 286. This information is used to select 288 the image window plane and helps define the limits of conventional image cropping which can be used to remove unwanted portions of the scene. The window plane can be chosen by selecting some object point which is to appear to lie in the plane of the print and to shift all the perspective views laterally until that point is imaged under the same lenticule. A necessary constraint of image cropping 290 is that the image field cannot be larger than the information captured. If this assessment is made only from a single image or a single stereoscopic pair from a complete family set, it is possible to overlook a condition that an extreme left or right perspective view may not cover the field seen in any other given view. The next step 292 is to conventionally convert the color metrics of the images from the storage system to the display characteristics of the computer system used to repixelize the final depth image print file. While it would be possible to incorporate all the file storage and image processing functions in one computer system, separate computers must be considered an embodiment of choice whenever the storage computer cannot be tied up in real time for the completion of repixelization and image printing. Block 294 shows the resealing procedure used to generate a perspective view file which has a number of lines equal to the number of lenticules to be used for the depth image. This depends on the media parameters, such as the lenticular spatial density 296 and the final picture size 298 which may not change from image to image in a given depth image generation system. Repixelization 300 is a computer procedure which interleaves lines sampled from different perspective files by placing rescaled lines retrieved from left views to the right of rescaled lines retrieved from right views, under any given lenticule, and to similarly repeat the process for all the lenticules in the display. The need for this inversion of lines while interleaving is to comply with the physics of the display as illustrated in FIG. 2. After generating a final print file by repixelization, the file format requires conversion 302 to a form compatible with the printer type selected and the print media that is to be used. This can include matrix calculations in conjunction with lookup tables, and conversions from red, green, and blue to cyan, yellow, and magenta color values and is therefore only practical when using a computer of sufficient capacity. In the preferred embodiment, during printing 304 of the image the print media will be a photographically active emulsion which responds to light delivered at each pixel site by the printer optical head with that light's color and exposure intensity modulated by the converted print file pixel values. The exact conversion algorithms and look up tables, which are conventional, depend on the system parameters, such as printer type 306 and print media 308. Since repixelization is an extra computer operation only engaged for image family sets actually to be printed as depth images, the print file resulting therefrom is converted 310 to the appropriate format and stored 312 under the same family set directory heading for later printing or reprinting. This will require color conversion back to the storage file formats and then later reconversion upon retrieval to the printer/media requirements.

The present invention describes storing resolution residuals and providing and storing images of various sizes for display during browsing where the displayable images are created using low pass filtering and subsampling. It is possible to not create such browsing images and store them but rather to create them as needed at the size needed from the BASE image. In addition, the system need not have only the three resolutions described but can include less or more resolution versions as needed. The description has also indicated that the depth image produced is the highest resolution reconstructed image. It is possible to use the lower resolution and smaller reconstructed images to create depth images. In such a situation, to maintain the perceived quality of the image, the size of the lenticules may have to be adjusted. Calculation of the size of the adjustment can be performed as is described in U.S. application Ser. No. 07/885,699. The present invention also discloses two different methods of performing image compression and reconstruction. Other methods can of course be used.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| REFERENCE NUMERAL LIST | |
| --- | --- |
| 10 | Digital Image |
| 12, 84 | Decomposition |
| 14, 86 | Encoding |
| 16, 88, 102 | Storage |
| 18, 90 | Decoding |
| 20, 92 | Recomposition |
| 22 | Printer |
| 24, 26, 28 | Video Display |
| 34 | Depth Images |
| 36, 38 | Perspective View |
| 40 | Faceplate |
| 42 | Surface |
| 43 | Pixels |
| 44 | Substrate |
| 45 | Adhesive |
| 46 | Image Cluster |
| 48 | Left Eye |
| 49 | Right Eye |
| 50 | Storage System |
| 52 | Capture Device |
| 54 | Scanning Device |
| 56, 66 | Computer |
| 58, 64 | Storage Device |
| 60 | Medium |
| 68 | Output Device |
| 80 | Image Capture |
| 82 | Scanning |
| 94, 96, 104, 108 | Dispiay |
| 98 | Compilation System |
| 100 | Image Interpolation |
| 106 | Printing |
| 120 | Decomposition Apparatus |
| 122 | Encoder |
| 124, 126 | Residual File |
| 128 | Base File |
| 130, 182, 184, 186 | Lowpass Filter |
| 132 | Subsample |
| 134, 136 | Image File |
| 140, 142 | Image File Set |
| 144, 146 | Interpolated Images |
| 150 | Directory Structure |
| 160 | Reconstruction Apparatus |
| 162 | Decoder |
| 164 | Display |
| 180 | Image |
| 181, 188, 192 | Subsample |
| 194 | Encoding Apparatus |
| 200 | Decoder |
| 202 | Reconstruction Apparatus |
| 204, 206, 208 | Decoding Apparatus |
| 210, 212, 214 | Image File |
| 230, 232, 234, 236, 238 | Flowchart Steps |
| 250, 252, 254, 256, 258, 260, 262, 264, 266 | Flowchart Steps |
| 268, 270 | Flowchart Steps |
| 280, 282, 284, 286, 288 | Flowchart Steps |
| 290, 292, 294, 296, 298, 300, 302, 304, 306, 308, 310, 312 | Flowchart Steps |

What is claimed is:

1. A depth image system, comprising:

decomposition means for decomposing a set of original images of a scene comprising a depth image, each original image being captured from a different perspective and each original image being decomposed into a group of multiresolution images forming groups of multiresolution images;

storage coupled to said decomposition means and storing the set of groups of the multiresolution images as linked images;

recomposition means for retrieving the multiresolution images of the linked images and reconstructing the original images of the scene at a particular resolution;

depth image production means for combining the reconstructed original images into a depth image; and display means for displaying the depth image.

2. A system as recited in claim 1, wherein said production means includes interpolation means for creating intermediate images each with a different perspective and used to produce the depth image.

3. A system as recited in claim 1, further comprising planar display means for displaying one of the reconstructed original images as a planar image.

4. A depth image method, comprising:
(a) capturing at least two original images of a scene as a set comprising a depth image, the original images captured from different viewpoints;
(b) decomposing the original images into groups of multiresolution images and storing the set of groups of multiresolution images as linked images;
(c) allowing a user to review the multiresolution images during a selection process;
(d) retrieving the multiresolution images of the linked images selected by the user and reconstructing the original images;
(e) combining the reconstructed images into a depth image; and
(f) displaying the depth image.

5. A method as recited in claim 4, wherein step (e) includes interpolating between the reconstructed images creating intermediate images each with a different perspective and used to produce the depth image.

6. A depth image storage system, comprising:
a storage medium;
a depth image capture system for capturing multiple images as a set of images of a scene from different perspectives as a depth image; and
a computer coupled to said capture system and said storage medium, decomposing the multiple images of the set into groups of multiresolution images and storing the multiresolution images on said storage medium as linked images.

7. A depth image retrieval and display system, comprising:
a storage medium storing a set of linked multiresolution images of a scene captured from different perspectives as a depth image;
a computer coupled to said storage medium, reconstructing original images of the scene from the set of linked multiresolution images and compiling the depth image from the reconstructed original images; and
a display device coupled to said computer and displaying the depth image.

8. A depth image system, comprising:
a depth image capture system capturing at least two original images of a scene from different view points as a set of linked images;
a first computer coupled to said depth image capture system and decomposing the original images into a set of linked multiresolution images including residual images and displayable images, said displayable images having a miniature image suitable for browsing;
a storage medium receiving and storing the multiresolution images;
a second computer retrieving the miniature image during browsing by a user, retrieving the set of linked multiresolution images when the miniature image is selected by the user for depth image reproduction during browsing, reconstructing the original images from the set of linked multiresolution images, and interleaving slices of the reconstructed original images to produce the depth image; and
a first output device coupled to said second computer and displaying the depth image; and
a second output device coupled to said second computer and displaying one of the reconstructed original images as a planar image.

9. A system as recited in claim 8, wherein said second computer interpolates between the at least two reconstructed original images creating intermediate images each with a different perspective and used to produce the depth image.

* * * * *